US005092030A

United States Patent [19]

Mori et al.

[11] Patent Number: 5,092,030

[45] Date of Patent: Mar. 3, 1992

[54] APPARATUS FOR ATTACHING TABS TO ELECTRIC WIRE ENDS

[75] Inventors: Katsuhisa Mori; Hideo Miyata, both of Osaka, Japan

[73] Assignee: Nichifu Terminal Manufacture Co., Ltd., Osaka, Japan

[21] Appl. No.: 633,533

[22] Filed: Dec. 27, 1990

[30] Foreign Application Priority Data

Dec. 29, 1989 [JP] Japan .............................. 1-341997

[51] Int. Cl.[5] .............................. B23P 19/00

[52] U.S. Cl. .............................. 29/745; 29/235; 29/243.56

[58] Field of Search ............ 29/234, 728, 235, 243.57, 29/745, 243.56, 33 E, 33 M

[56] References Cited

U.S. PATENT DOCUMENTS

| | | | |
|---|---|---|---|
| 3,177,566 | 4/1965 | Hester | 29/745 X |
| 4,034,450 | 7/1977 | Carlomagno et al. | 29/745 X |
| 4,417,394 | 11/1983 | Moody et al. | 29/745 X |
| 4,432,124 | 2/1984 | Breuers | 29/235 |
| 4,574,440 | 3/1986 | Wirth et al. | 29/235 X |
| 4,581,805 | 4/1986 | Wrobel et al. | 29/235 X |
| 4,603,465 | 8/1986 | Bretti et al. | 29/235 X |
| 4,682,411 | 7/1987 | Tomes, Jr. | 29/745 |
| 4,791,707 | 12/1988 | Tucker | 29/243.50 X |
| 4,996,755 | 3/1991 | Sato | 29/243.56 |

*Primary Examiner*—Timothy V. Eley

*Assistant Examiner*—R. Martin

*Attorney, Agent, or Firm*—Edwin E. Greigg; Ronald E. Greigg

[57] ABSTRACT

A method for attaching a wire-identifying tab to an electric wire end, the tab comprising a marking portion having identification mark and being a cylinder having a slit extending axially over the full length of the tab, the method comprising the steps of engaging the tab with a pair of rigid sheets in contact with each other at their upper portions, from their one ends and in parallel with them, subsequently inserting the wire end into the tab while the pair of sheets are displaced apart from each other perpendicular to the tab, and finally disengaging the sheets from the tab, thus fitting an outer surface of the wire end in the tab. An apparatus used in the method comprises a wire receiving section, a tab receiving section, at least one of the sections moves relative to the other to come into or out of contact therewith, the wire receiving section including a wire end supporter and a terminal supporter disposed with a distance substantially equal to the tab, the tab receiving section including a pair of rigid sheets extending parallel with the wire received on the section, a tab-holding space formed above the sheets so as to hold the tab, an urging means disposed remote from said section so as to elastically press the marking portion, and a retracting means retracting the sheets out of the space.

1 Claim, 6 Drawing Sheets

APPARATUS FOR ATTACHING TABS TO ELECTRIC WIRE ENDS

BACKGROUND OF THE INVENTION

1. Field of the Invention

The invention relates to an apparatus for attaching tabs to electric wire ends, the tabs being small markers which distinguish one electric wire from another.

2. Description of Prior Art

It is a widespread practice to connect a plurality of individual electric wires with conductive terminals at their ends to a common integrated electric connector and to detachably join the connector to another integrated electric connector of the same or similar type or to any other electric apparatuses. It is also a common practice to apply markings to the individual wires in order to avoid erroneous or confused connection thereof. Wire-identifying tabs carrying or printed with the markings have usually been attached to the electric wires not automatically but manually because the tabs in general are of cylindrical shape. Such a manual operation in attaching the tabs to the wires has consequently made lower the efficiency in mass-production of the integrated connectors in a case wherein ten thousands or more connectors of the same type are manufactured.

SUMMARY OF THE INVENTION

An object of the invention, which was made in view of the current circumstances described above, is therefore to provide an apparatus for mechanically or automatically attaching cylindrical wire-identifying tabs to electric wires with an improved efficiency, wherein the wire-identifying tabs have, as already proposed in the industry, outer peripheral surfaces on which wire-identifying symbolic marks are printed or written and each have a slit extending over the full length in axial direction of each tab.

This object is accomplished in the following manner as described below by using the reference numerals on the accompanying drawings which illustrate embodiments of the present invention. From an aspect of the invention, an apparatus for attaching wire-identifying tabs comprises the steps of mounting the wire-identifying tab 1 having a slit 2 onto a pair of thin rigid sheets 11 and 11 disposed in parallel and almost in contact with each other at their upper portions, the slit 2 allowing the rigid sheets 11 to be inserted in the tab so that their opposite surfaces are gripped together by the slit after the tab is completely inserted to the sheets 11 from their one ends and in parallel with them, subsequently inserting an end of an electric wire (K) into the wire-identifying tab 1 while the pair of the thin rigid sheets 11 and 11 are being relatively displaced apart from each other in a direction perpendicular to the tab 1 so as to increase the width of its slit 2, and finally pulling the rigid sheets 11 and 11 away from the wire-identifying tab 1 so as to release engagement of the sheets 11 with the tab 1, thereby securedly fitting outer peripheral surface of the end of the electric wire (K) in the wire-identifying tab 1.

From a further aspect of the invention, an apparatus for attaching wire-identifying tabs comprises the steps of preparing a pair of thin rigid sheets 11 and 11 respectively having contact portions 11*a* lying parallel and substantially in contact with each other so as to receive a wire-identifying tab 1, the rigid sheets further having wire-receiving portions 11*b* tapered outwardly to form a space with an increasing distance between them, mounting the tab 1 having a slit 2 onto a pair of the contact portions 11*a* of the sheets 11, the slit 2 allowing said contact portions 11*a* to be inserted in the tab so that their opposite surfaces are gripped together by the slit after the tab is completely inserted to the said portions of the sheets 11 from their one ends, subsequently causing an end of an electric wire (K) to take a position parallel with the rigid sheets and to move into the space between the wire- receiving portions 11*b* of the rigid sheets 11 towards the contact portions 11*a*, then inserting the end of the electric wire (K) into the wire-identifying tab 1 while said wire is causing the contact portions 11*a* of the thin rigid sheets 11 and 11 to be relatively displaced apart from each other thereby increasing the width of the slit 2 of the tab 1 wherein the sheets serve as a guide means for the electric wire, and finally releasing engagement of the wire-identifying tab 1 with the contact portions 11*a* of said sheets 11 to thereby fixedly secure the tab 1 to an outer peripheral surface of the end of the electric wire (K).

From a still further aspect, the present invention provides an apparatus for attaching wire-identifying tabs in accordance with the above operation. The apparatus comprises a wire receiving section (A) to hold in place an end of an electric wire (K), a tab receiving section (B) to hold in place a wire-identifying tab 1, at least one of the sections (A) and (B) being controlled to move relative to the other so as come into or out of contact therewith, the wire receiving section (A) including at least one of a wire end supporter 24 and a terminal supporter 5 adapted to support a terminal fixed to the end of the wire (K), the wire end supporter 24 being disposed apart from the terminal supporter 25 by a distance equal to or longer than the wire-identifying tab 1, the tab receiving section (B) including a pair of thin rigid sheets 11 and 1 substantially in contact with each other and disposed at an end portion of the tab receiving section (B) opposite to the wire receiving section (A), the rigid sheets extending parallel with the electric wire when it is received on the section (A), a tab holding space 12 formed behind the rigid sheets 11 and remote from the wire receiving section (A) so as to hold the wire-identifying tab 1, an urging means 14 also disposed remote from said section (A) so as to elastically press a marking portion 3 of the tab 1, and a retracting means for retracting the thin rigid sheets 11 out of the tab holding space 12.

The wire-identifying tabs used in the apparatus in the invention each have a marking portion to which a proper identification mark is applied. The tabs are of a cylindrical shape and each having a slit formed to extend in an axial direction throughout the full length of the tab.

The identification mark may be applied to the marking portion of the wire-identifying tab by means of any suitable apparatus such as a printing machine employing an ink, a thermal printer employing an ink ribbon, or a marking press adapted to form a carved seal.

In order to facilitate the marking operation, it is preferable to form the marking portion of the tab with an appropriate plastics. It is more desirable to make the whole tab as an integral piece by using such plastics.

In exercising the operation of the apparatus in the invention, the end of each electric wire (K) will be manually or mechanically caused to rest on predetermined places (i.e., on the supporters 24 and 25). The the wire-identifying tab 1 is also manually or mechanically caused to take a predetermined position ( i.e., to be set in the tab holding space 12) so that the wire (K) and the tab 1 can subsequently be forced in a simple manner to move towards each other until they contact mutually.

According to the apparatus of the invention, the wire-identifying tabs can be attached easily and readily to the electric wire ends even if any crimp contacts or solderless contacts or any insulating sleeves have been fixed to said ends. Thus, high operation efficiency is ensured in attaching such wire-identifying tabs to the wires which are to be connected to one integrated connector.

BRIEF DESCRIPTION OF THE DRAWINGS

In the accompanying drawings which illustrate an apparatus and steps of operation of the invention.

DETAILED DESCRIPTION OF PREFERRED EMBODIMENTS

Preferred embodiments of the invention will now be described in detail referring to the accompanying drawings.

Figure 4:
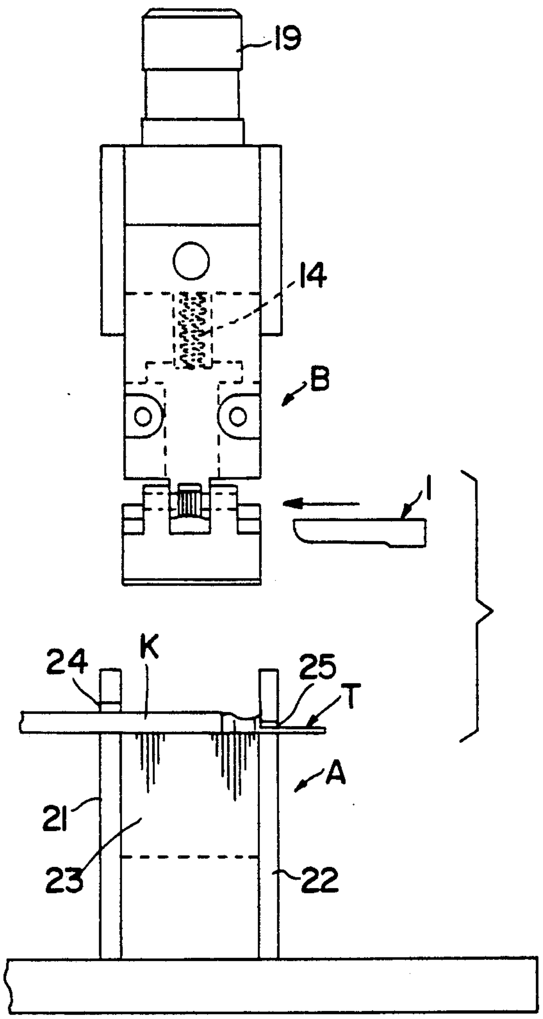
FIG. 4 is a front elevation the principal part.
Figure 5A:
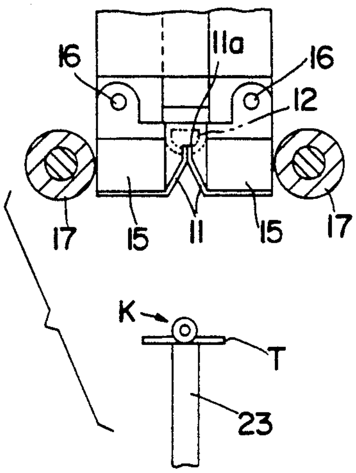
FIGS. 5A to 5E are schemes showing sequential steps of operation exercised in an embodiment of the invention.
Figure 5B:
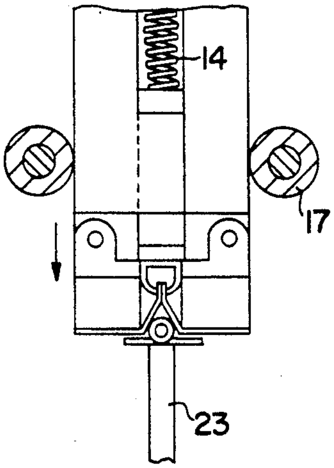
Figure 5C:
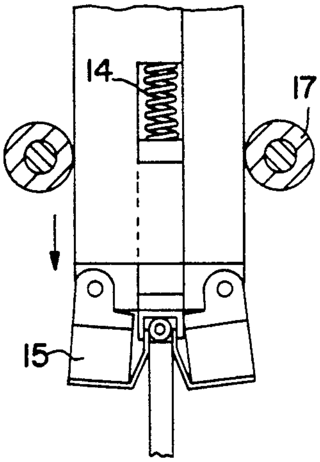
Figure 5D:
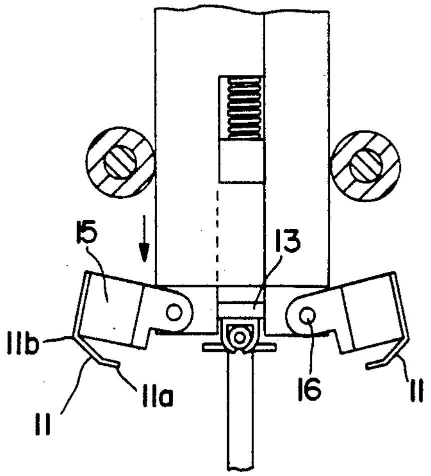
Figure 5E:
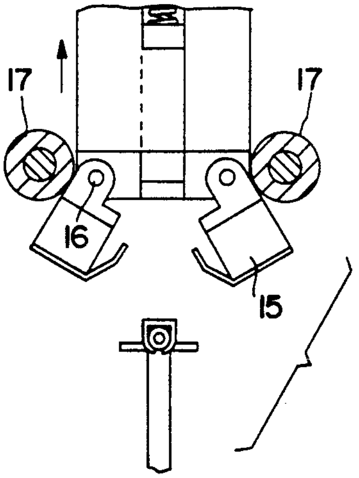
Figure 6:
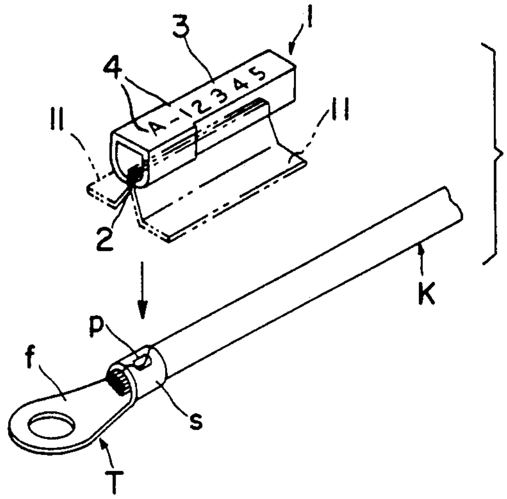
FIGS. 6 and 7 are perspective views illustrating some of the steps.
Figure 7:
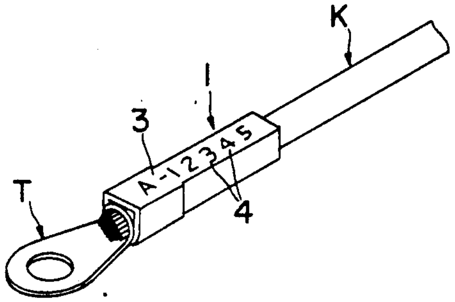
Figure 8:
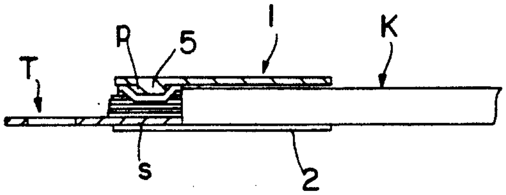
FIG. 8 is a vertical cross-sectional view also showing one of the steps.

A first embodiment is illustrated in FIGS. 1 to 8 wherein FIGS. 1 to 5E show an apparatus in the embodiment, with FIGS. 5A to 5E showing an operation therein. FIGS. 6 to 8 illustrate a relationship between an electric wire (K) and a wire-identifying tab 1 in the operation.

For reasons of convenience, the apparatus in the first embodiment will be described at first.

Figure 1:
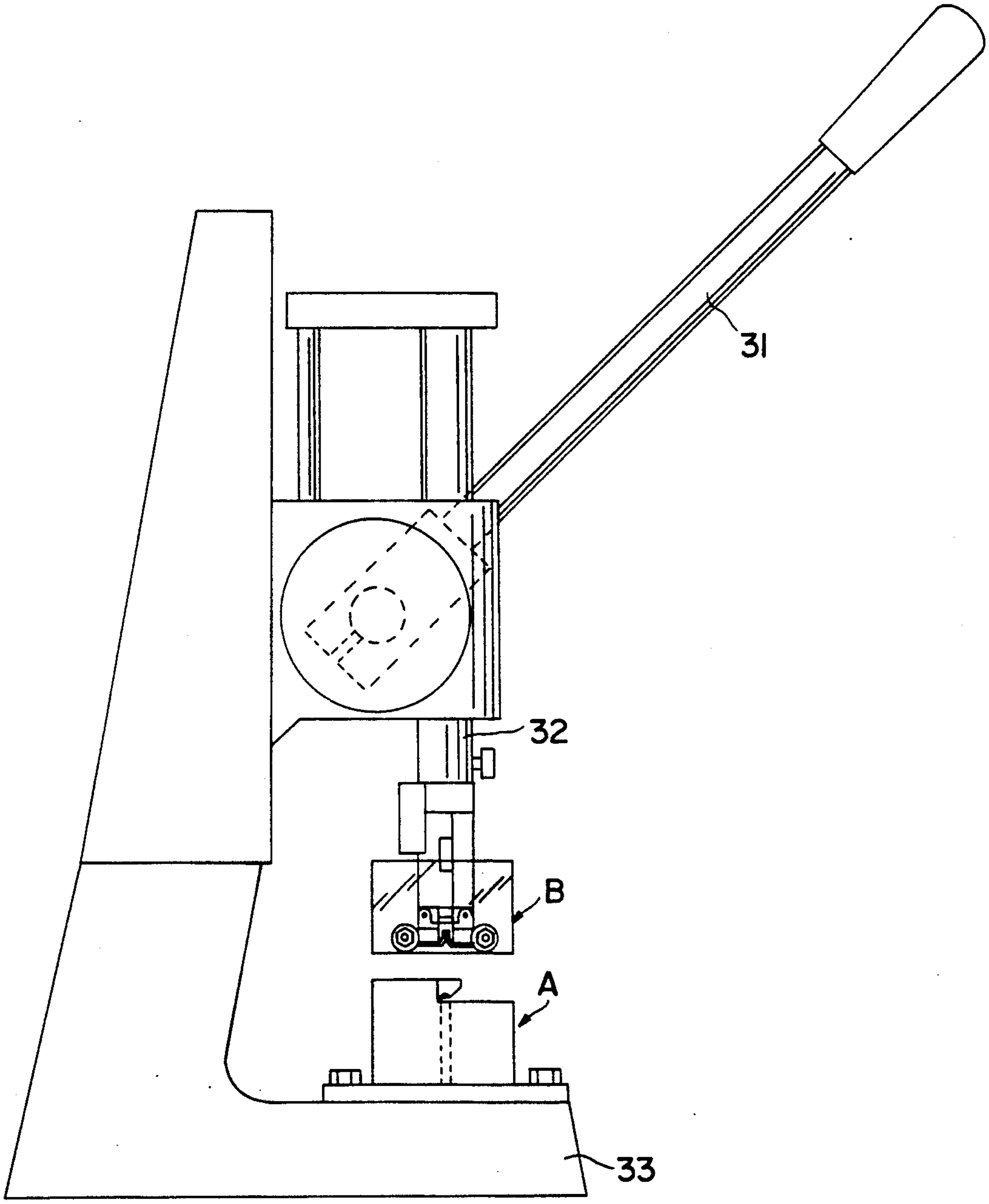
FIG. 1 is a side elevation showing an apparatus as a whole in an embodiment of the invention.
Figure 2:
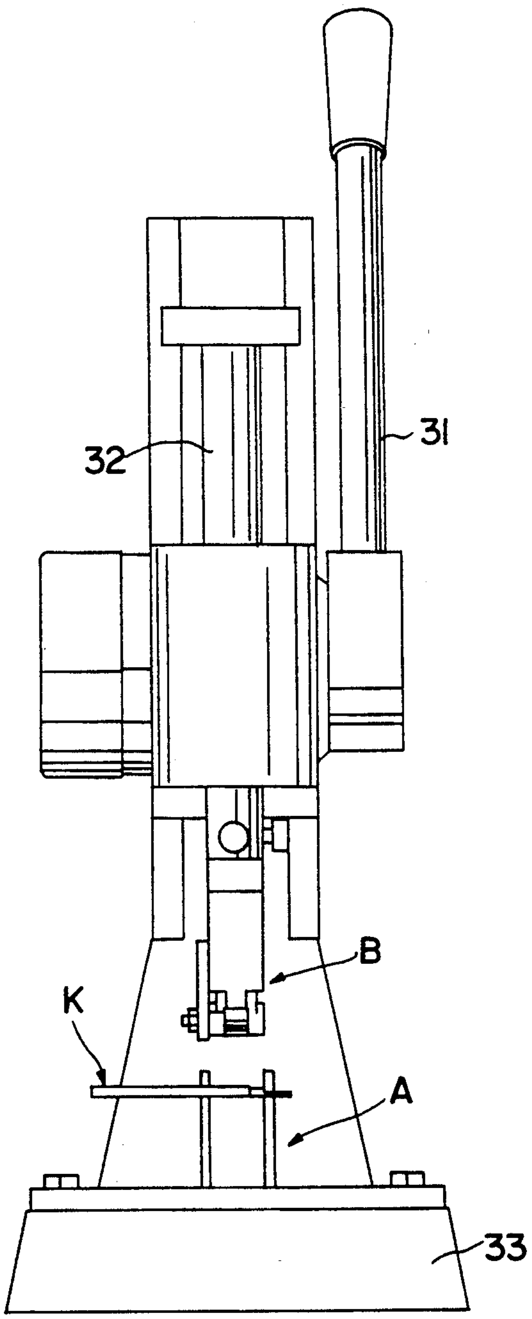
FIG. 2 is a front elevation of the apparatus in the embodiment.
Figure 3:
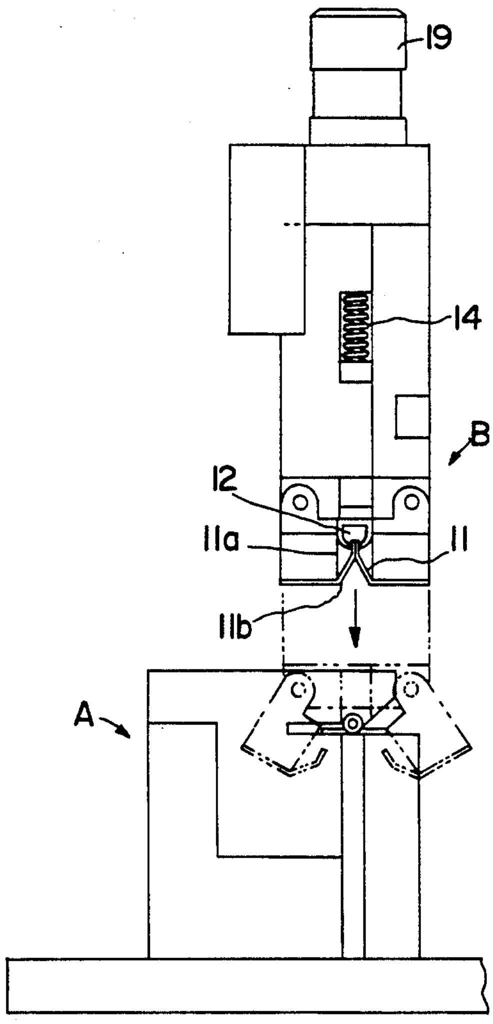
FIG. 3 is a side elevation of a principal part of the apparatus.

As shown in FIGS. 1 and 2 illustrating the apparatus on the whole, the apparatus which is manually operated and vertically arranged comprises an actuating lever 31 for actuating a main shaft 32. With the actuating lever 31 pushed downwards, the main shaft 32 is lowered which will automatically return to its home position as shown in FIGS. 1 and 2 by releasing the lever 31. Secured to a lower end of the main shaft 32 is a retaining shaft 19 to which a tab receiving section (B) is tightly connected as shown in FIGS. 3 and 4. A wire receiving section (A) is fixed on a base frame 33 which is located below the tab receiving section (B).

As will be apparent already, the apparatus is composed of two main parts, that is, the wire receiving section (A) for holding in place an end of the electric wire (K) and the tab receiving section (B) for holding in place the wire-identifying tab 1. In this embodiment, the tab receiving section (B) is raised and lowered by operating the lever 31 so as to move towards and away from the wire receiving section (A). The wire receiving section (A) comprises a pair of upright plates 21 and 22 spaced apart from each other by a distance equal to or more than the length of the wire-identifying tab 1. Supporters 24 and 25 are formed near tops of the upright plates 21 and 22, respectively, so as to receive and hold the end of wire (K) and a flat portion of conductive terminal (T) attached to said wire end. The wire receiving section further comprises a perpendicular plate 23 which are perpendicular to and extending between the upright plates 24 and 25.

On the other hand, the tab receiving section (B) comprises a pair of thin rigid sheets 11 and 11 disposed at its lower portion opposite to the wire receiving section (A). As is shown in FIG. 3, the rigid sheets 11 have their lower portions 11*b* and 11*b* which taper downwards to increase a distance between them thereby forming a conical or horn-like shape in the side elevation. The rigid sheets 11 further comprise upper portions 11*a* and 11*a* substantially in contact with each other and parallel with the wire which is to be laid on the wire receiving section. Rocking members 15 and 15 are pivoted by pins 16 to the lower portion of the tab receiving section so that said rigid sheets are secured to the rocking members 15 so as to be opened and closed together with them.

A tab holding space 12 holding the wire-identifying tab 1 is formed above the rigid sheets 11 and remote from the wire receiving section (A). A coiled spring 14 as an urging means is also disposed above the rigid sheets and remote from said section (A) so as to elastically push a reciprocating head 13 which in turn presses a marking portion 3 of the tab 1. A retracting means is also provided to retract the thin rigid sheets 11 downwards out of the tab holding space 12 when said sheets are lowered from their position in FIG. 5C to their lower position in FIG. 5D.

FIGS. 5A to 5E illustrate in course of time such a function or operation of the various members. In particular, the rocking members 15 are opened sideways due to a spring means (not shown) as schematized in FIG. 5D when they are released from the wire-identifying tab 1. Guide rollers 17 respectively cause the rocking members 15 to return to their home position in FIG. 5A when the tab receiving section is retracted upwards as shown in FIG. 5E.

The wire-identifying tab 1 shown in FIG. 6 comprises a marking portion 3 which is made flat on the outer peripheral surface of the tab so that any suitable identifying mark 4 can be applied to the portion 3. A slit 2 extends axially of the wire-identifying tab from one end thereof to the other end. The tab 1 is D-shaped in its cross section and comprises a small lug 5 protruding from its inner surface, the lug being of a size such as to engage with a crimped pit (p) on the surface of a sleeve (s) of the terminal (T) when the tab is attached to the wire (K) as shown in FIG. 8.

Figure 9:
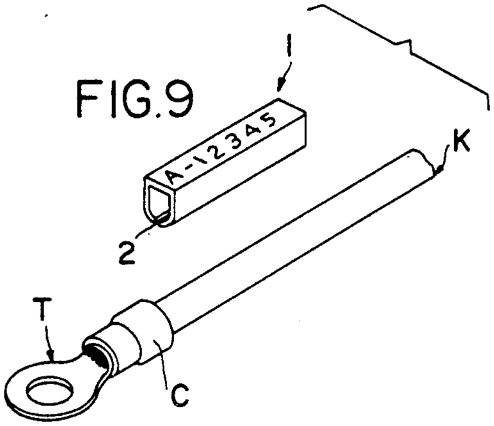
FIGS. 9 and 10 are further perspective views illustrating some steps of another operation in another embodiment.
Figure 10:
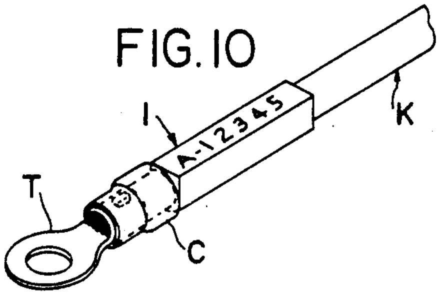
Figure 11A:
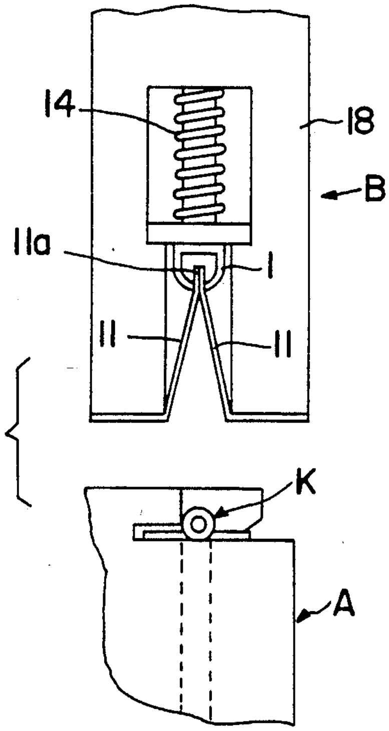
FIGS. 11A to 11D are schemes showing sequential steps of still another operation exercised in a further embodiment of the invention.
Figure 11B:
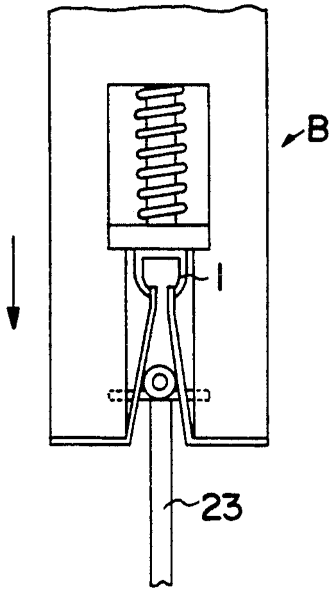
Figure 11C:
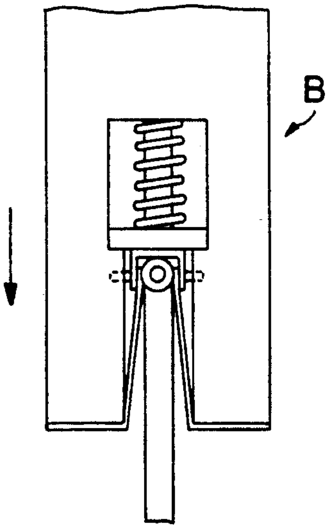
Figure 11D:
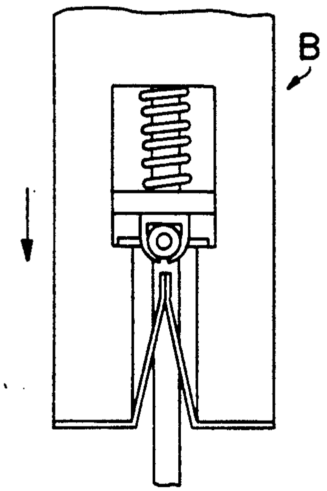

The wire-identifying tab 1 in FIGS. 9 and 10 is attached to the wire (K) at its end portion in close proximity of a terminal cover (C).

FIGS. 11A to 11D illustrate in course of time an operation in another embodiment wherein the rocking members 15 in the first embodiment are dispensed with. The thin rigid sheets 11 and 11 are directly secured to an elevating frame 18. In this case, the rigid sheet 11 are more elongate in vertical direction than in those in the first embodiment so as to form a vertically elongate conical or horn-like shape in the side elevation. The wire (K) is directly guided into the tab along the elongate rigid sheets. Other features are the same as the first embodiment.

Though the receiving sections (A) and (B) are arranged vertically relative to each other in the embodiments described above, it will however be understood that they may be arranged in a horizontal direction.

It is a matter of course that any other appropriate modifications can be made within a scope of the present invention.

What is claimed is:

1. An apparatus for attaching wire-identifying tabs to electric wire ends, the tabs each comprising a marking portion 3 having an identification mark 4 and being of a cylinder having a slit 2 extending axially over the full length of the tab, the apparatus comprising: a wire receiving section (A) to hold in place the end of the electric wire; a tab receiving section (B) to hold in place the tab 1; at least one of the sections (A) and (B) controlled to move relative to the other so as come into or out of contact therewith; the wire receiving section (A) including at least one of a wire end supporter 24 and a terminal supporter 25 supporting a terminal fixed to the wire end; the supporters 24 and 25 spaced a distance equal to or longer than the wire-identifying tab 1; the tab receiving section (B) including a pair of thin rigid sheets 11 substantially in contact with each other and disposed at an end portion of the tab receiving section (B) opposite to the wire receiving section (A); the rigid sheets extending parallel with the electric wire when it is received on the section (A); a tab holding space 12 formed behind the rigid sheets 11 and remote from the wire receiving section (A) so as to hold the wire-identifying tab 1; an urging means 14 also disposed remote from said section (A) so as to elastically press the marking portion 3 of the tab 1; and a retracting means for retracting the thin rigid sheets 11 out of the tab holding space 12.

* * * * *